Nov. 22, 1966 E. VERTICCHIO 3,287,040
TELESCOPIC ASSEMBLY AND LOCKING MEANS THEREFOR
Filed July 7, 1964

INVENTOR
ERMINIO VERTICCHIO
BY
ATTORNEY.

3,287,040
TELESCOPIC ASSEMBLY AND LOCKING
MEANS THEREFOR
Erminio Verticchio, Staten Island, N.Y., assignor to Leo Prager, Inc., New York, N.Y., a corporation of New York
Filed July 7, 1964, Ser. No. 380,775
1 Claim. (Cl. 287—58)

The present invention relates to a telescopic assembly which comprises telescopic members and locking means therefor.

Telescoping members which are securely, but releasably locked together are known. It is one object of the present invention to provide a telescopic member comprising telescopic members which are readily adjustable throughout a wide variety of relative positions, and conveniently operable locking means for securely but readily releasably locking these members in any of a plurality of relative positions thereof.

It is another object of the present invention to provide a telescopic assembly comprising conveniently adjustable support means consisting of telescopic members and having locking means of very simple, durable and inexpensive design and construction.

It is still another object of the present invention to provide a telescopic assembly comprising conveniently adjustable support means which are particularly, though not exclusively, adapted for use in adjustable, floor costumer display fixtures.

With these and other objects in view, which will become apparent in the following detailed description, the present invention will be clearly understood in connection with the accompanying drawings, in which.

Figure 1:
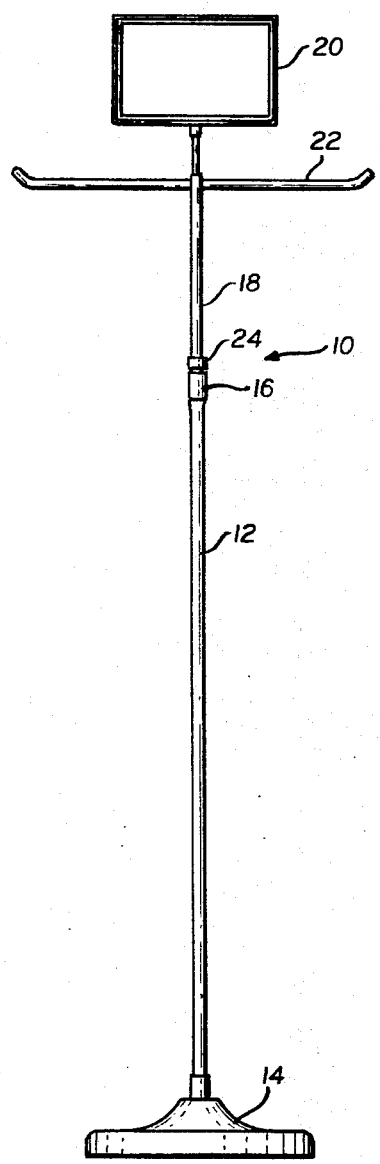
FIGURE 1 is a front elevation of an adjustable floor costumer incorporating a preferred embodiment of the telescopic members and locking means of the present invention.
Figure 2:
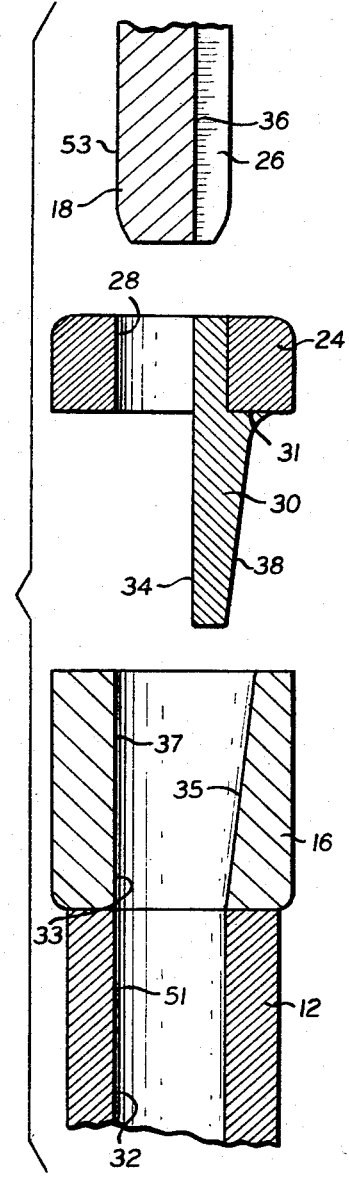
FIG. 2 is an exploded longitudinal sectional view of the telescopic members and locking means.
Figure 6:
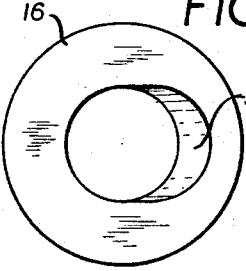
FIG. 6 is a top plan view of the other of the telescopic members.

Referring now to the drawings, an adjustable floor costumer is indicated generally at 10 in FIG. 1 and comprises a tubular support post 12 having a bore 32 and which includes a generally circular base member 14 affixed to the lower extremity thereof in any convenient manner, and a slightly enlarged fitting 16 at the upper extremity of the support post 12. The fitting 16 may be attached to the upper extremity of the support post 12 in any convenient manner. A bore 33 extends through the fitting 16 and includes an upper downwardly tapered wall surface 35 which reduces the diameter of the bore 33 to the diameter of the bore 32 in the support post 12 at the juncture of the support post 12 and the fitting 16, as best seen in FIGS. 2 and 6. A support rod 18, including suitable display support fixtures, as indicated at 20 and 22 in FIG. 1 affixed to the upper portion thereof in any convenient manner, fits within the bore 32 of the tubular support post 12 in relatively free telescopic relationship thereto, so that the support rod 18 is readily adjustable vertically throughout a plurality of positions relative to the support post 12, to thereby enable the convenient adjustment of the height of the display support fixtures 20 and 22. Readily releasable locking means including a tubular locking collar 24 fit over the support rod 18 just above the support post fitting 16 and cooperate, in a manner discussed in detail in conjunction with the drawings, with the support rod 18 and the support rod 12, to securely lock the support rod 18 in any predetermined of the relative vertical positions thereof.

Referring now in greater detail to the drawings, the support rod 18 includes a longitudinally extending groove 26 formed on the outer surface thereof and extending along a substantial portion of the length of the support rod 18. The tubular locking collar 24 includes a bore 28 formed therein through which the support rod 18 may readily extend. A wedge 30, extending therefrom and tapered downwardly, is affixed to the locking collar 24 in any suitable manner, as for example by welding, as indicated at 31. The wedge 30 is dimensioned such to have a free, sliding fit within the groove 26 formed in the support rod 18, whereby the manner in which the support rod 18 may extend slidably through the locking collar 24 with the wedge 30 located within the groove 26 in key-like fashion, may be readily understood. The wedge 30 includes a tapered surface 38 which is dimensioned to fit tightly against the tapered surface 35 of the bore 33 in the fitting 16 when the wedge 34 is inserted therein, as discussed below. The bores are dimensioned to freely receive, but firmly locate the support rod 18 without undesirable canting of the latter relative thereto. Preferably, the support post 12, the locking collar 24 and the support rod 18 are of brass, while the wedge 34 is of steel to provide a relatively high friction locking surface therebetween.

In use, the locking collar 24 is fitted over the support rod 18 with the wedge 30 of the former slidably positioned within the groove 26 of the latter as discussed above, and the locking collar 24 is held slightly above the fitting 16 on the support post 12, while the support rod 18 is moved through the locking collar 24 into the bore 33 of the fitting 16 and therethrough onto the bore 32 in the support post 12 to assume the position of the support rod 18 relative to the support post 12, which will in turn support the display support fixtures 20 and 22 at the desired positions thereof.

Figure 3:
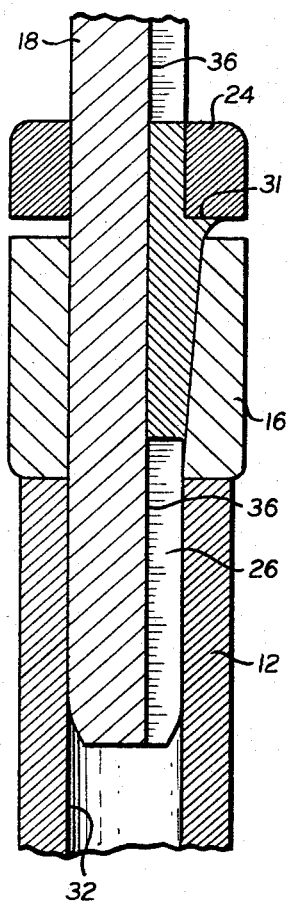
FIG. 3 is a longitudinal sectional view of the telescopic members and locking means in the assembled position thereof.
Figure 4:
FIGS. 4 and 5 are bottom plan views of one of the telescopic members, and of the locking means, respectively.
Figure 5:
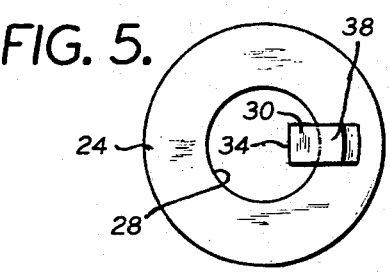

When the support rod 18 and the support post 12 have assumed the desired relative positions thereof, the locking collar 24 is moved on the support rod 18 toward the fitting 16 on the support post 12, whereby the wedge 30 will enter the bore 33 in the fitting 16 and move thereinto until the tapered surface 38 of the wedge 30 is fitted tightly against the similarly dimensioned and complementary tapered surface 35 of the bore 33 in the fitting 16 and stopped from further downward movement thereby in the manner indicated by FIG. 3. This will securely lock the support rod 18 and the support post 12 as now relatively positioned due to the high frictional contact between the steel surface 34 of the wedge 30 and the brass surface 36 of the groove 26 in the support rod 18, and between the brass surfaces 37 and 51 of the respective bores 33 and 32 and the brass surface 53 of the support rod which is now pressed tightly thereagainst by the action thereon of the surface 34 of the wedge 30. At this point the wedge 30 will have moved almost all of the way into the bore 33 in the fitting 16 to present the attractive appearance illustrated in FIG. 1. No appreciable pressure need be exerted on the locking collar 24 to move the wedge 30 into the bore 33 of the fitting 16 to securely lock the support rod 18 relative to the support post 12, because of the excellent frictional locking characteristic inherent in the surface contacts between the hard steel wedge 30 and the relatively soft brass rod 18. Readjustment of the support rod 18 relative to the support post 12 requires only the movement of the locking collar 24 away from the fitting 16 on the supporting post 12, to remove at least some portion of the wedge 30 from within the bore 33, which movement of the locking collar 24 may be conveniently effected by hand without need for impact or prying devices, followed by the movement of the support rod 18 within the bore 32 in the support post 12 to a new position of the support rod 18 relative to the support post 12, and finally, the movement of the locking collar 24 on the support rod 18 toward the fitting 16 on the support post 12, to again lock the support rod 18 as newly positioned in the manner discussed above.

While I have disclosed one embodiment of the present invention, it is to be understood that this embodiment is given by example only and not in a limiting sense, the scope of the present invention being determined by the objects and the claim.

I claim:

In an adjustable, telescopic assembly, a first elongated member having a longitudinal bore formed therein, a second elongated member having an outer surface substantially complementary to said bore along at least a portion thereof and slidable within said bore to a plurality of positions relative to said first member, said second elongated member having a radially oriented longitudinal groove extending along the outer face of said portion, a tapered fitting member axially and longitudinally affixed to said first elongated member and having a tapered bore extending from an enlarged bore portion to a narrow bore portion, said narrow bore portion being coterminous to said bore of the first elongated member, said tapered bore defining a substantially frustoconical surface portion, a freely slidable circular member having an axial bore identical to and axially aligned with said bore of said first elongated member and slidably disposed in snug slidable engagement about said outer surface of said second elongated member, a narrow wedge having a length substantially equal to the longitudinal length of said tapered fitting member, said wedge slidably disposed in close fitting relationship in said longitudinal groove and rigidly secured to said slidable circular member, said wedge having a varying radial thickness along its axial length slightly greater than said radial extent of said groove and having an outer frustoconical face complementary to said frustoconical surface portion of said tapered bore of said tapered fitting member for abutting engagement therewith, for locking said second elongated member longitudinally relative said first elongated member, said frustoconical surface portion of said tapered bore subtending a substantially larger circumferential arc than that subtended by said outer frustoconical face of said wedge, said second elongated member being locked longitudinally relative said member in a plurality of positions by axially sliding said slidable circular member and said wedge along said second elongated member and said longitudinal groove therein, respectively, until said outer frustoconical face of said wedge snugly abuts said frustoconical surface portion of said fitting tapered member, and said second elongated member being released with respect to said elongated first member by moving said wedge along said groove away from said tapered fitting member.

References Cited by the Examiner

UNITED STATES PATENTS

| | | |
|---|---|---|
| 438,283 | 10/1890 | Collier. |
| 1,412,235 | 4/1922 | Felix. |
| 1,630,870 | 5/1927 | Strunck. |
| 2,459,221 | 1/1949 | Farrington. |

OTHER REFERENCES

Baumeister, T.: Marks' Mechanical Engineers' Handbook, 6th. ed., McGraw-Hill, 1958, Sec. 3, p. 40.

CARL W. TOMLIN, *Primary Examiner.*

THOMAS F. CALLAGHAN, *Examiner.*

T. A. LISLE, *Assistant Examiner.*